(12) United States Patent
Wang et al.

(10) Patent No.: US 11,296,842 B2
(45) Date of Patent: Apr. 5, 2022

(54) METHOD AND APPARATUS FOR IMPLEMENTING NONSTANDARD BANDWIDTH AS WELL AS NETWORK DEVICE COMPRISING THE APPARATUS

(71) Applicant: Telefonaktiebolaget LM Ericsson (publ), Stockholm (SE)

(72) Inventors: Li Wang, Beijing (CN); Qingyu Miao, Beijing (CN); Yanda Tong, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 2 days.

(21) Appl. No.: 16/631,337

(22) PCT Filed: Aug. 16, 2017

(86) PCT No.: PCT/CN2017/097626
§ 371 (c)(1),
(2) Date: Jan. 15, 2020

(87) PCT Pub. No.: WO2019/033290
PCT Pub. Date: Feb. 21, 2019

(65) Prior Publication Data
US 2020/0228265 A1 Jul. 16, 2020

(51) Int. Cl.
*H04W 28/16* (2009.01)
*H04W 28/20* (2009.01)
(Continued)

(52) U.S. Cl.
CPC .............. *H04L 5/0046* (2013.01); *H04L 1/04* (2013.01); *H04L 5/0096* (2013.01);
(Continued)

(58) Field of Classification Search
CPC ........... H04W 72/0453; H04W 72/042; H04W 72/0413; H04W 72/04; H04W 28/16; H04W 28/20; H04L 27/10
See application file for complete search history.

(56) References Cited

U.S. PATENT DOCUMENTS 8,891,467 B2 11/2014 Awoniyi et al.
9,001,758 B2 4/2015 Das et al.
(Continued)

FOREIGN PATENT DOCUMENTS

EP 1227657 A3 12/2004
EP 2339871 A3 1/2013
(Continued)

OTHER PUBLICATIONS

International Search Report and Written Opinion of the International Searching Authority for PCT International Application No. PCT/CN2017/097626 dated May 3, 2018.
(Continued)

*Primary Examiner* — Jae Y Lee
*Assistant Examiner* — Aixa A Guadalupe Cruz
(74) *Attorney, Agent, or Firm* — Christopher & Weisberg, P.A.

(57) ABSTRACT

Method and apparatus are disclosed for implementing a nonstandard bandwidth at a network device. According to an embodiment, a first amount of physical resource blocks (PRBs) available in the nonstandard bandwidth is determined. A second amount of PRBs available in a standard bandwidth corresponding to the nonstandard bandwidth is determined. A central frequency shift of the nonstandard bandwidth relative to the standard bandwidth is determined based at least on the first amount of PRBs and second amount of PRBs. A network device comprising the apparatus is also disclosed.

15 Claims, 9 Drawing Sheets

(51) Int. Cl.
  *H04L 5/00* (2006.01)
  *H04L 1/04* (2006.01)
  *H04L 27/10* (2006.01)
  *H04W 72/04* (2009.01)

(52) U.S. Cl.
  CPC .......... *H04W 28/16* (2013.01); *H04W 28/20* (2013.01); *H04L 27/10* (2013.01); *H04W 72/0453* (2013.01)

(56) References Cited

U.S. PATENT DOCUMENTS

| | | | |
|---|---|---|---|
| 2014/0126498 | A1 | 5/2014 | Koorapaty et al. |
| 2015/0333881 | A1* | 11/2015 | Shang ................... H04L 5/0044 370/328 |
| 2016/0337963 | A1* | 11/2016 | Nabki ................... G06F 3/0346 |
| 2017/0012761 | A1 | 1/2017 | Koorapaty et al. |
| 2017/0339677 | A1* | 11/2017 | Rico Alvarino ...... H04L 5/0007 |
| 2018/0070267 | A1* | 3/2018 | Ye ......................... H04W 16/00 |
| 2018/0288643 | A1* | 10/2018 | Schmidt ................ H04W 76/10 |

FOREIGN PATENT DOCUMENTS

| | | |
|---|---|---|
| EP | 2779700 A1 | 9/2014 |
| EP | 3288303 A1 | 2/2018 |
| WO | 2016183720 A1 | 11/2016 |

OTHER PUBLICATIONS

European Search Report for European Patent Application No. 17921582.7 dated Jun. 23, 2020.

\* cited by examiner

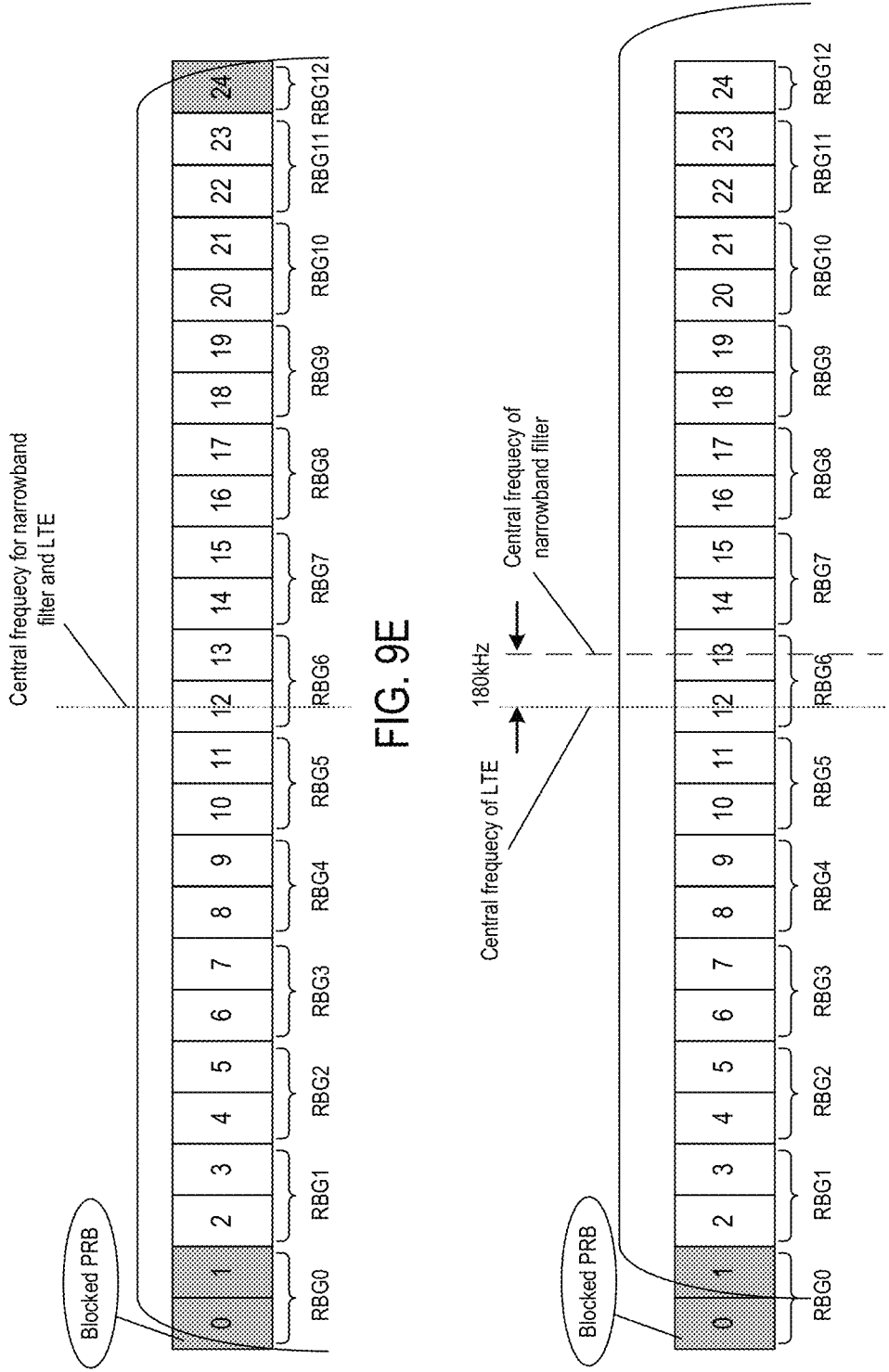

METHOD AND APPARATUS FOR IMPLEMENTING NONSTANDARD BANDWIDTH AS WELL AS NETWORK DEVICE COMPRISING THE APPARATUS

CROSS REFERENCE TO RELATED APPLICATION

This application is a 35 U.S.C. § 371 national stage application of PCT International Application No. PCT/CN2017/097626, filed on Aug. 16, 2017, the disclosure and content of which is incorporated herein by reference in its entirety.

TECHNICAL FIELD

Embodiments of the disclosure generally relate to wireless communication, and, more particularly, to method and apparatus for implementing nonstandard bandwidth as well as network device comprising the apparatus.

BACKGROUND

There is an increasing demand for long term evolution (LTE) carrier bandwidths other than the ones defined in 3rd generation partnership project (3GPP). The reason is normally that a network operator has a spectrum that would almost but not entirely fit a standard carrier bandwidth. The network operator is usually not willing to choose a narrower standard carrier bandwidth, as it would waste too much effort. Therefore, it would be desirable to provide an effective solution for implementing a nonstandard bandwidth.

SUMMARY

This summary is provided to introduce a selection of concepts in a simplified form that are further described below in detailed description. This summary is not intended to identify key features or essential features of the claimed subject matter, nor is it intended to be used to limit the scope of the claimed subject matter.

One of the objects of the disclosure is to provide an effective solution for implementing a nonstandard bandwidth.

According to one aspect of the disclosure, it is provided a method for implementing a nonstandard bandwidth at a network device. The method comprises determining a first amount of physical resource blocks (PRBs) available in the nonstandard bandwidth. The method further comprises determining a second amount of PRBs available in a standard bandwidth corresponding to the nonstandard bandwidth. The method further comprises determining a central frequency shift of the nonstandard bandwidth relative to the standard bandwidth, based at least on the first and second amounts.

In an embodiment of the disclosure, determining the central frequency shift comprises calculating a third amount of one or more PRBs that are blocked on the edge(s) of the standard bandwidth. The third amount equals to a difference between the second and first amounts. Determining the central frequency shift further comprises, when the third amount is even, setting the central frequency shift as zero. Determining the central frequency shift further comprises, when the third amount is odd, setting the central frequency shift as a half of a PRB bandwidth, or an opposite number of a half of a PRB bandwidth.

In an embodiment of the disclosure, the central frequency shift is determined based further on a resource block group (RBG) size corresponding to the nonstandard bandwidth.

In an embodiment of the disclosure, determining the central frequency shift comprises calculating a third amount of one or more PRBs that are blocked on the edge(s) of the standard bandwidth. The third amount equals to a difference between the second and first amounts. Determining the central frequency shift further comprises calculating a fourth amount of one or more full RBGs available in the third amount of PRBs. Determining the central frequency shift further comprises calculating a first remainder, for a division of the third amount by the RBG size. Determining the central frequency shift further comprises calculating a second remainder, for a division of the second amount by the RBG size. Determining the central frequency shift further comprises setting the central frequency shift based on the fourth amount, the first and second remainders.

In an embodiment of the disclosure, setting the central frequency shift comprises, when the fourth amount is even and the first remainder is less than or equal to the second remainder, setting the central frequency shift as the first remainder multiplied by a half of a PRB bandwidth. Setting the central frequency shift further comprises, when the fourth amount is even and the first remainder is greater than the second remainder, setting the central frequency shift as an opposite number of the first remainder multiplied by a half of a PRB bandwidth. Setting the central frequency shift further comprises, when the fourth amount is odd and the first remainder is less than or equal to the second remainder, setting the central frequency shift as a half of a PRB bandwidth multiplied by a difference between the first remainder and the RBG size. Setting the central frequency shift further comprises, when the fourth amount is odd and the first remainder is greater than the second remainder, setting the central frequency shift as an opposite number of a half of a PRB bandwidth multiplied by a sum of the first remainder and the RBG size.

In an embodiment of the disclosure, determining the first amount comprises selecting a bandpass filter corresponding to the nonstandard bandwidth. Determining the first amount further comprises calculating a passband bandwidth of the bandpass filter. Determining the first amount further comprises calculating the first amount based on the passband bandwidth.

According to another aspect of the disclosure, it is provided an apparatus for implementing a nonstandard bandwidth at a network device. The apparatus comprises a processor and a memory. The memory contains instructions executable by the processor, whereby the apparatus is operative to determine a first amount of PRBs available in the nonstandard bandwidth. The apparatus is further operative to determine a second amount of PRBs available in a standard bandwidth corresponding to the nonstandard bandwidth. The apparatus is further operative to determine a central frequency shift of the nonstandard bandwidth relative to the standard bandwidth, based at least on the first and second amounts.

In an embodiment of the disclosure, the instructions are executable by the processor, whereby the apparatus is operative to determine the central frequency shift by calculating a third amount of one or more PRBs that are blocked on the edge(s) of the standard bandwidth. The third amount equals to a difference between the second and first amounts. The apparatus is operative to determine the central frequency shift by, when the third amount is even, setting the central frequency shift as zero. The apparatus is operative to determine the central frequency shift by, when the third amount is odd, setting the central frequency shift as a half of a PRB bandwidth, or an opposite number of a half of a PRB bandwidth.

In an embodiment of the disclosure, the instructions are executable by the processor, whereby the apparatus is operative to determine the central frequency shift based further on a resource block group (RBG) size corresponding to the nonstandard bandwidth.

In an embodiment of the disclosure, the instructions are executable by the processor, whereby the apparatus is operative to determine the central frequency shift by calculating a third amount of one or more PRBs that are blocked on the edge(s) of the standard bandwidth. The third amount equals to a difference between the second and first amounts. The apparatus is operative to determine the central frequency shift by calculating a fourth amount of one or more full RBGs available in the third amount of PRBs. The apparatus is operative to determine the central frequency shift by calculating a first remainder, for a division of the third amount by the RBG size. The apparatus is operative to determine the central frequency shift by calculating a second remainder, for a division of the second amount by the RBG size. The apparatus is operative to determine the central frequency shift by setting the central frequency shift based on the fourth amount, the first and second remainders.

In an embodiment of the disclosure, the instructions are executable by the processor, whereby the apparatus is operative to set the central frequency shift by, when the fourth amount is even and the first remainder is less than or equal to the second remainder, setting the central frequency shift as the first remainder multiplied by a half of a PRB bandwidth. The apparatus is operative to set the central frequency shift by, when the fourth amount is even and the first remainder is greater than the second remainder, setting the central frequency shift as an opposite number of the first remainder multiplied by a half of a PRB bandwidth. The apparatus is operative to set the central frequency shift by, when the fourth amount is odd and the first remainder is less than or equal to the second remainder, setting the central frequency shift as a half of a PRB bandwidth multiplied by a difference between the first remainder and the RBG size. The apparatus is operative to set the central frequency shift by, when the fourth amount is odd and the first remainder is greater than the second remainder, setting the central frequency shift as an opposite number of a half of a PRB bandwidth multiplied by a sum of the first remainder and the RBG size.

In an embodiment of the disclosure, the instructions are executable by the processor, whereby the apparatus is operative to determine the first amount by selecting a bandpass filter corresponding to the nonstandard bandwidth. The apparatus is operative to determine the first amount by calculating a passband bandwidth of the bandpass filter. The apparatus is operative to determine the first amount by calculating the first amount based on the passband bandwidth.

In an embodiment of the disclosure, the apparatus is included in a radio unit (RU) of the network device.

In an embodiment of the disclosure, the apparatus is included in a digital unit (DU) of the network device.

According to another aspect of the disclosure, it is provided a network device. The network device comprises a radio admission control (RAC) configured to obtain a bandwidth configuration from an operation administration and maintenance (OAM). The network device further comprises a radio unit (RU) comprising the apparatus according to the above aspect. The RU is further configured to obtain the bandwidth configuration from the RAC and feedback information about the determined central frequency shift and the first amount of PRBs to the RAC. The RAC is further configured to, based on the information feedback, determine one or more PRBs that are blocked on the edge(s) of the standard bandwidth. The network device further comprises a digital unit (DU) configured to obtain information about the one or more PRBs and the central frequency shift from the RAC and determine, based on the obtained information, which PRB(s) are to be blocked for resource scheduling.

According to another aspect of the disclosure, it is provided a computer program product. The computer program product comprises instructions which when executed by at least one processor, cause the at least one processor to perform the method according to the above aspect.

According to another aspect of the disclosure, it is provided a computer readable storage medium. The computer readable storage medium comprises instructions which when executed by at least one processor, cause the at least one processor to perform the method according to the above aspect.

According to another aspect of the disclosure, it is provided an apparatus for implementing a nonstandard bandwidth at a network device. The apparatus comprises a first determination module for determining a first amount of PRBs available in the nonstandard bandwidth. The apparatus further comprises a second determination module for determining a second amount of PRBs available in a standard bandwidth corresponding to the nonstandard bandwidth. The apparatus comprises a third determination module for determining a central frequency shift of the nonstandard bandwidth relative to the standard bandwidth, based at least on the first and second amounts.

These and other objects, features and advantages of the disclosure will become apparent from the following detailed description of illustrative embodiments thereof, which are to be read in connection with the accompanying drawings.

BRIEF DESCRIPTION OF THE DRAWINGS

FIGS. 9A-9F show comparison results between the existing solution and the solution according to an embodiment of the disclosure;

DETAILED DESCRIPTION

Figure 1:
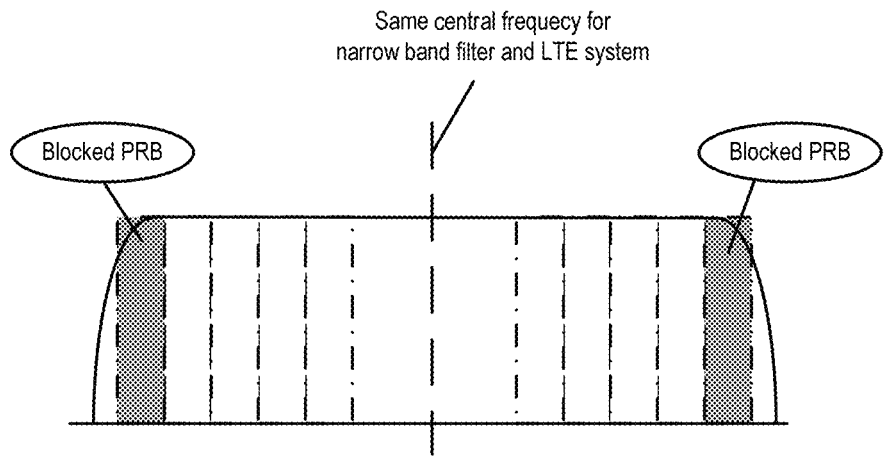
FIG. 1 shows an example of an existing nonstandard bandwidth implementation.

For the purpose of explanation, details are set forth in the following description in order to provide a thorough understanding of the embodiments disclosed. It is apparent, however, to those skilled in the art that the embodiments may be implemented without these specific details or with an equivalent arrangement.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable, and/or other suitable the first generation (1G), the second generation (2G), 2.5G, 2.75G, the third generation (3G), the fourth generation (4G), 4.5G, the future fifth generation (5G) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

FIG. 1 shows an example of an existing nonstandard bandwidth implementation. In this example, a narrowband digital filter is used to fit a nonstandard narrowband carrier request. The central frequency of the narrowband digital filter is set to be the same as the central frequency of LTE system. In this way, mobile broadband (MBB) needs to block one edge physical resource block (PRB) on each side. Thus, it is required to block at least two PRBs because the minimum scheduling unit is one PRB.

Due to the symmetrically blocked PRBs, the existing solution will block even number of PRBs. However, in some scenarios, only odd number of PRBs (e.g., only one PRB) need to be blocked on the edge(s) of a LTE standard bandwidth to implement the nonstandard bandwidth. Thus, the existing solution will reduce the spectral efficiency in these scenarios.

The present disclosure proposes a solution for implementing a nonstandard bandwidth at a network device such as a base station. The nonstandard bandwidth refers to a channel bandwidth which is not contained in standard channel bandwidths such as evolved universal terrestrial radio access (E-UTRA) channel bandwidths. The nonstandard bandwidth may be, for example, 4.5 MHz, 9 MHz, and so on. Hereinafter, the solution will be described in detail with reference to FIGS. 2-11. Although the solution will be described below in the context of LTE system, those skilled in the art can understand that the principle of the present disclosure may also be applied to any other suitable communication standard.

Figure 2:
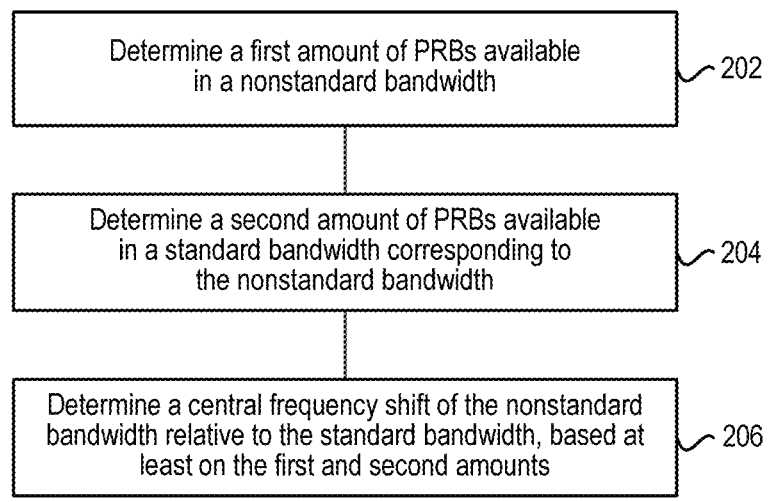
FIG. 2 is a flowchart illustrating a method for implementing a nonstandard bandwidth according to an embodiment of the disclosure.
Figure 3:
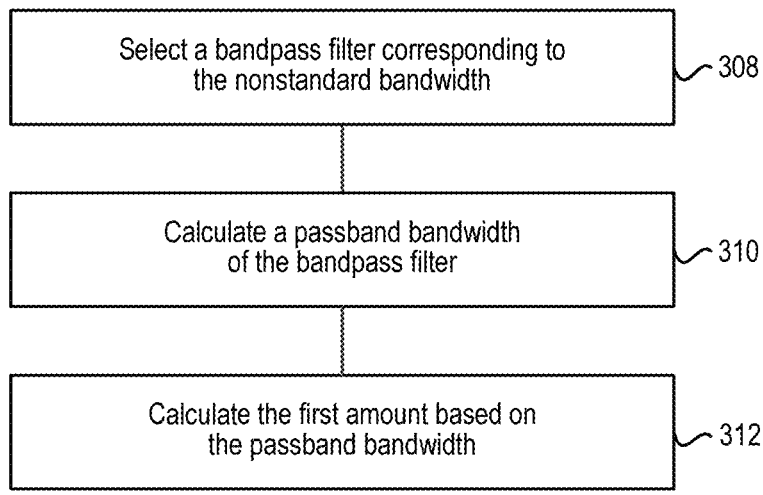
FIG. 3 is a flowchart for explaining the method of FIG. 2.
Figure 4:
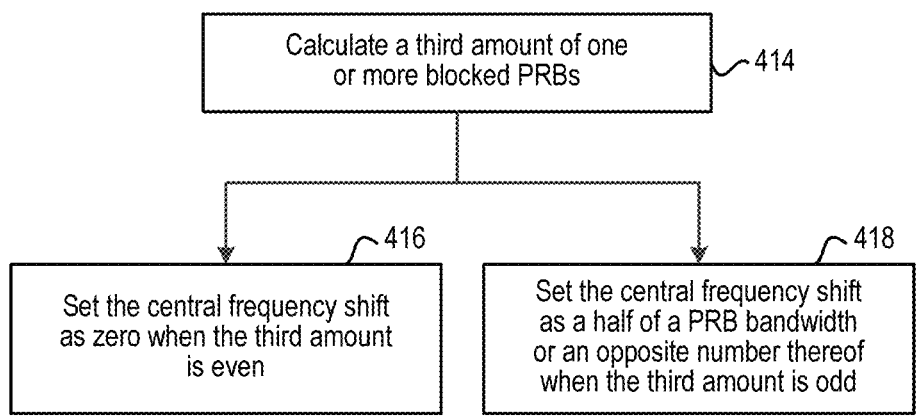
FIG. 4 is another flowchart for explaining the method of FIG. 2.

FIG. 2 is a flowchart illustrating a method for implementing a nonstandard bandwidth according to an embodiment of the disclosure. The method may be performed by an apparatus at a network device such as a base station. The nonstandard bandwidth may be configured by a network operator and the configuration of the nonstandard bandwidth (also referred to as the bandwidth configuration) may be informed to the network device.

Figure 5:
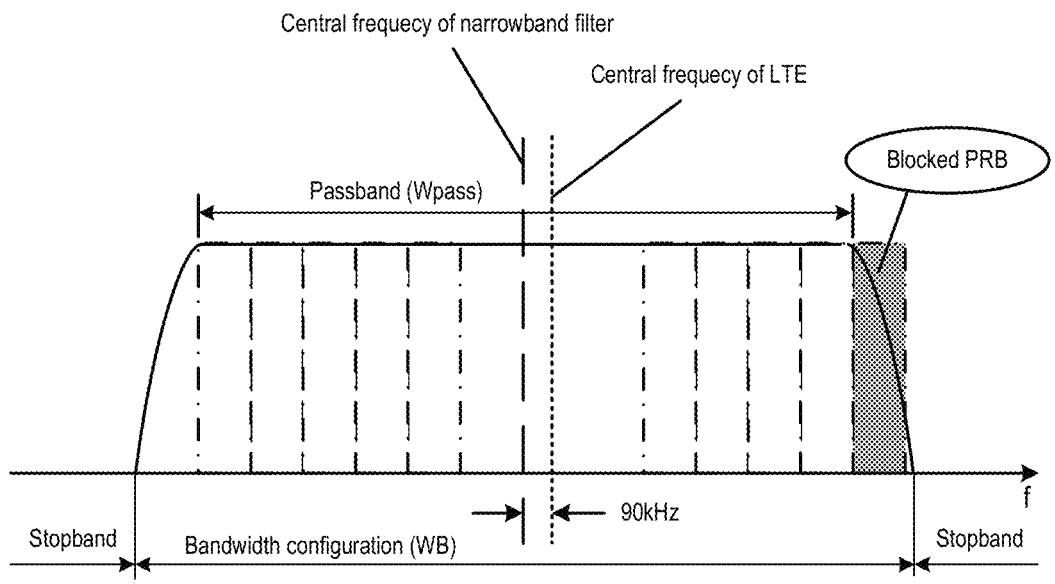
FIG. 5 shows an example of a nonstandard bandwidth implementation according to an embodiment of the disclosure.

At block 202, a first amount of PRBs available in the nonstandard bandwidth is determined. This block may be implemented as blocks 308-312 of FIG. 3. At block 308, a bandpass filter corresponding to the nonstandard bandwidth is selected. For example, the bandpass filter may be selected such that the difference between its upper and lower cutoff frequencies approximates or equals to the bandwidth configuration, as shown in FIG. 5 which illustrates an embodiment of the present disclosure.

At block 310, it is calculated a passband bandwidth of the bandpass filter. For example, as shown in FIG. 5, the passband bandwidth (denoted as Wpass) may be calculated as the bandwidth configuration (denoted as WB) multiplied by a ratio (denoted as Rpass). That is, Wpass=WB*Rpass. For a plurality of bandpass filters available at the network device, their parameters WB and Rpass (=Wpass/WB) may be predetermined and stored in advance in a form of, for example, a table. In this way, the selection as shown in block 308 and the calculation as shown in block 310 can be facilitated.

At block 312, the first amount is calculated based on the passband bandwidth. For example, the first amount (denoted as Nprb) may be calculated as the integer part of the quotient obtained by dividing the passband bandwidth by a PRB bandwidth (denoted as Wprb). That is, Nprb=floor(Wpass/Wprb), where floor(x) denotes a function that returns the largest integer equal to or less than x. Since a PRB bandwidth in LTE is 180 kHz, the first amount can be calculated as floor(Wpass/180 kHz) in LTE context.

Referring back to FIG. 2, at block 204, it is determined a second amount of PRBs available in a standard bandwidth corresponding to the nonstandard bandwidth. For example, the standard bandwidth (denoted as $BW_{LTE}$ in LTE context) may be selected as the one whose size is nearest to the size of the bandwidth configuration. Then, the second amount (denoted as $N_{RB-LTE}$ in LTE context) may be determined according to the selected standard bandwidth.

For example, in LTE protocol "3GPP TS 36.104", Table 5.6-1 presents the transmission bandwidth configuration $N_{RB}$ in E-UTRA channel bandwidths as follows:

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

Thus, the standard bandwidth and the second amount can be determined as follows:
1) If WB≤1.4 MHz, then $BW_{LTE}$=1.4 MHz, $N_{RB-LTE}$=6;
2) If 1.4 MHz<WB≤3 MHz, then $BW_{LTE}$=3 MHz, $N_{RB-LTE}$=15;
3) If 3 MHz<WB≤5 MHz, then $BW_{LTE}$=5 MHz, $N_{RB-LTE}$=25;
4) If 5 MHz<WB≤10 MHz, then $BW_{LTE}$=10 MHz, $N_{RB-LTE}$=50;
5) If 10 MHz<WB≤15 MHz, then $BW_{LTE}$=15 MHz, $N_{RB-LTE}$=75;
6) If 15 MHz<WB≤20 MHz, then $BW_{LTE}$=20 MHz, $N_{RB-LTE}$=100.

At block 206, a central frequency shift of the nonstandard bandwidth relative to the standard bandwidth is determined based at least on the first and second amounts. As a first option, this block may be implemented as blocks 414-418 of FIG. 4. At block 414, it is calculated a third amount of one or more PRBs that are blocked on the edge(s) of the standard bandwidth. The third amount equals to a difference between the second and first amounts. That is, the third amount (denoted as $N_{BlockedPRB}$) may be calculated as: $N_{BlockedPRB}$=$N_{RB-LTE}$−Nprb.

If the third amount is even, the central frequency shift (denoted as $FShift_{LTE}$ in LTE context) is set as zero at block 416. That is, $FShift_{LTE}$=0 if $N_{BlockedPRB}$ is even. On the other hand, if the third amount is odd, the central frequency shift is set as a half of a PRB bandwidth, or an opposite number of a half of a PRB bandwidth at block 418. That is, $FShift_{LTE}$=±½*Wprb=±90 kHz if $N_{BlockedPRB}$ is odd. Here, the positive central frequency shift represents shifting to the left side on a frequency axis, while the negative central frequency shift represents shifting to the right side on a frequency axis.

FIG. 5 shows an example of a nonstandard bandwidth implementation according to an embodiment of the disclosure. In the scenario shown in FIG. 5, a narrow nonstandard bandwidth is requested to be implemented and the third amount $N_{BlockedPRB}$ is odd. Suppose $N_{BlockedPRB}$=2k+1, where k is an integer. Then, according to the existing solution as shown in FIG. 1, the central frequency of the narrowband filter is the same as the central frequency of LTE system. Thus, the 2k+1 PRBs will be symmetrical about the LTE central frequency. That is, on each of the left and right sides of the LTE central frequency, there will be k+0.5 PRBs to be blocked. Since the minimum scheduling unit is one PRB, there will be k+1 PRBs to be blocked for each side. As a result, there will be 2k+2 PRBs to be blocked, thereby causing a waste of one PRB.

However, according to the solution of the present disclosure, $FShift_{LTE}$=90 kHz when $N_{BlockedPRB}$ is odd. By shifting the central frequency of the narrowband filter by 90 kHz, there will be k PRBs to be blocked for the left side and there will be k+1 PRBs to be blocked for the right side. As a result, there will be 2k+1 PRBs to be blocked, thereby saving one PRB when compared with the existing solution. Likewise, if the central frequency of the narrowband filter is shifted to the right side, the same effect can be achieved.

In this way, an unsymmetrical solution can be provided by making the central frequency shift to select maximum available bandwidth for LTE standard bandwidth configuration. This means that the central frequency of the bandpass filter is different from the LTE central frequency. As a result, any number (not only even number but also odd number) of PRBs can be blocked. For example, only one PRB can be blocked when it is required to block one PRB to implement the nonstandard bandwidth. This will increase one PRB spectral efficiency when compared with the existing solution.

Figure 6:
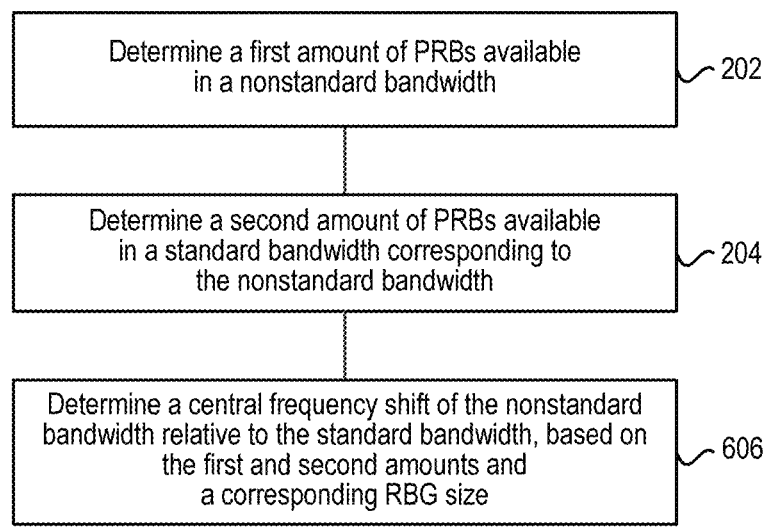
FIG. 6 is another flowchart for explaining the method of FIG. 2.

Referring back to FIG. 2, as a second option, block 206 may be implemented as block 606 of FIG. 6. At block 606, the central frequency shift is determined based on the first and second amounts and further on a resource block group (RBG) size corresponding to the nonstandard bandwidth. For example, in LTE protocol "3GPP TS 36.213", Table 7.1.6.1-1 presents type 0 resource allocation RBG size vs. downlink system bandwidth as follows:

| System Bandwidth $N_{RB}^{DL}$ | RBG Size (P) |
|---|---|
| ≤10 | 1 |
| 11-26 | 2 |
| 27-63 | 3 |
| 64-110 | 4 |

Thus, the RBG size can be determined as follows:
1) If WB≤1.4 MHz, then $N_{RB-LTE=6}$, P=1;
2) If 1.4 MHz<WB≤3 MHz, then $N_{RB-LTE}$=15, P=2;
3) If 3 MHz<WB≤5 MHz, then $N_{RB-LTE}$=25, P=2;
4) If 5 MHz<WB≤10 MHz, then $N_{RB-LTE}$=50, P=3;
5) If 10 MHz<WB≤15 MHz, then $N_{RB-LTE}$=75, P=4;
6) If 15 MHz<WB≤20 MHz, then $N_{RB-LTE}$=100, P=4.

Figure 7:
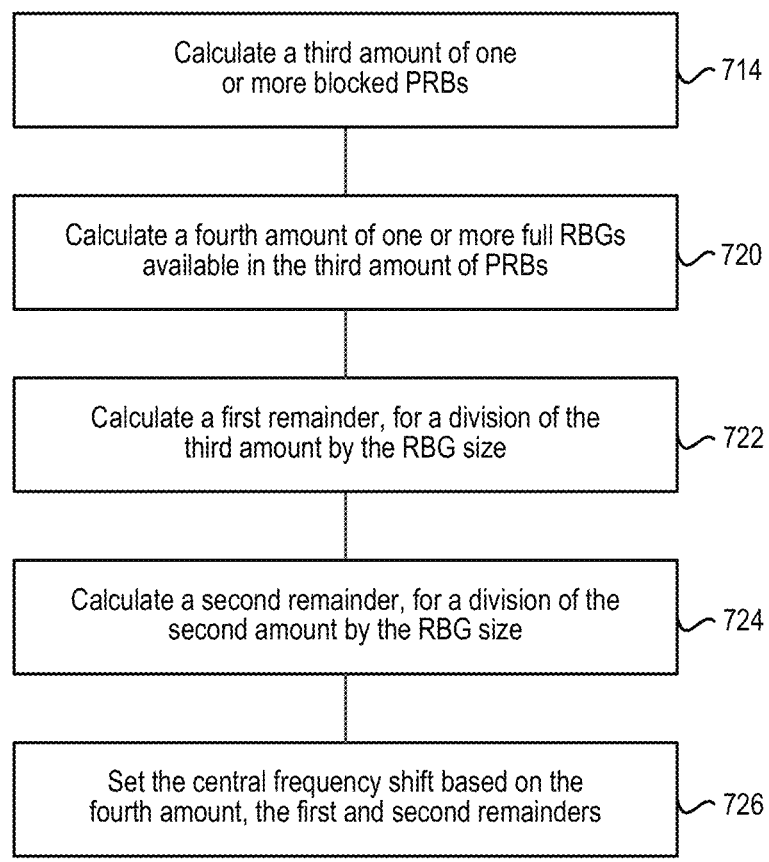
FIG. 7 is a flowchart for explaining the method of FIG. 6.
Figure 8:
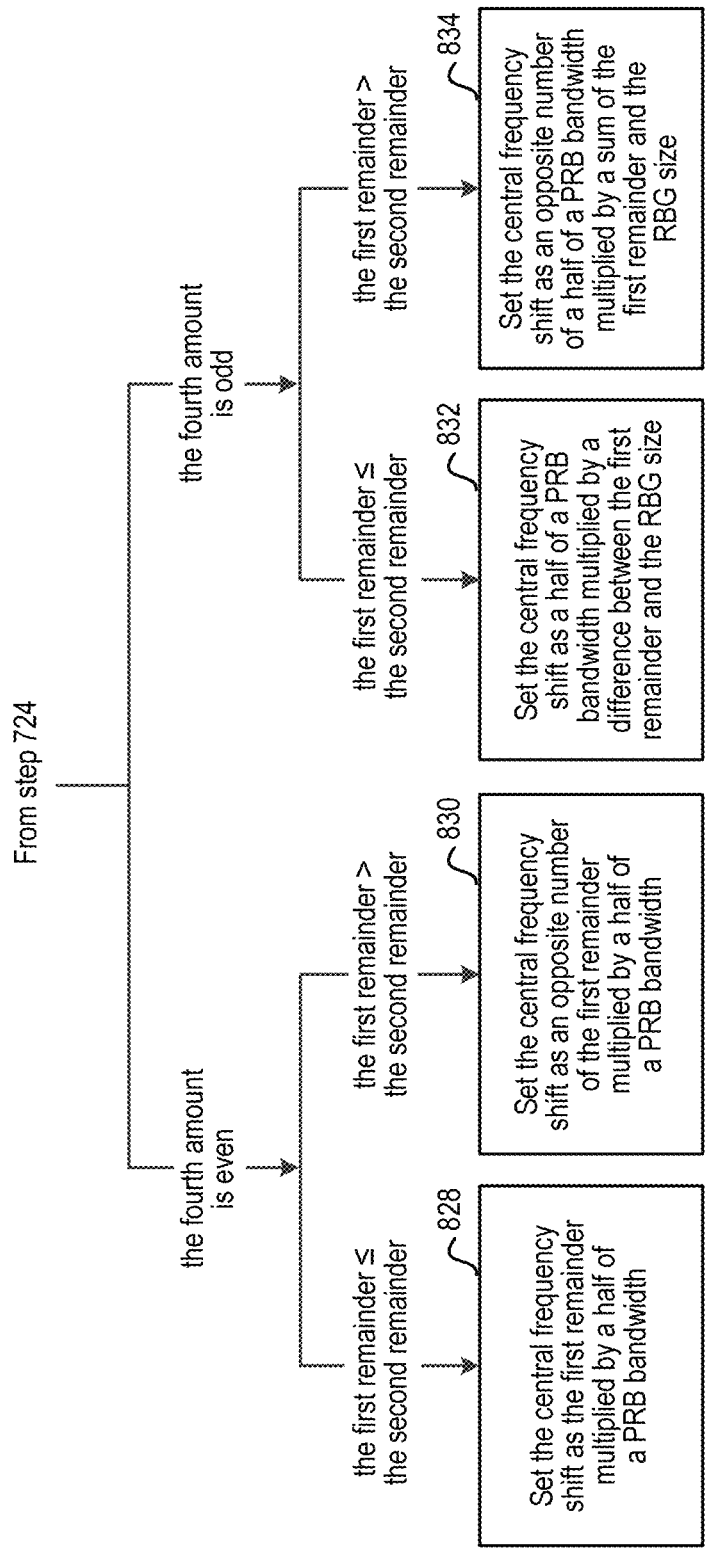
FIG. 8 is another flowchart for explaining the method of FIG. 6.

Block 606 may be implemented as blocks 714-726 of FIG. 7. At block 714, a third amount (denoted as $N_{BlockedPRB}$) of one or more PRBs is calculated that are blocked on the edge(s) of the standard bandwidth. The third amount equals to a difference between the second and first amounts. This block is similar to block 314 of FIG. 3.

At block 720, a fourth amount of one or more full RBGs available in the third amount of PRBs is calculated. For example, the fourth amount (denoted as $N_{BlockedRBG}$) may be calculated as the integer part of the quotient obtained by dividing the third amount by the RBG size. That is, $N_{BlockedRBG}$=floor($N_{BlockedPRB}$/P).

At block 722, a first remainder (denoted as $N_{Remainder}$) is calculated for a division of the third amount by the RBG size. That is, $N_{Remainder}=N_{BlockedPRB}-N_{BlockedRBG}*P$.

At block 724, a second remainder (denoted as $N_{Remainder-LTE}$ in LTE context) is calculated for a division of the second amount by the RBG size. That is, $N_{Remainder-LTE}=N_{RB-LTE}-\text{floor}(N_{RB-LTE}/P)*P$. It should be noted that blocks 720-724 may be performed in any other suitable order besides what is shown in FIG. 7.

At block 726, the central frequency shift is set based on the fourth amount, the first and second remainders. This block may be implemented as blocks 828-834 of FIG. 8.

At block 828, the central frequency shift is set as the first remainder multiplied by a half of a PRB bandwidth, when the fourth amount is even and the first remainder is less than or equal to the second remainder. That is, $FShift_{LTE}=N_{Remainder}*90$ kHz if $N_{BlockedRBG}$ is even and $N_{Remainder} \leq N_{Remainder-LTE}$.

At block 830, the central frequency shift is set as an opposite number of the first remainder multiplied by a half of a PRB bandwidth, when the fourth amount is even and the first remainder is greater than the second remainder. That is, $FShift_{LTE}=-N_{Remainder}*90$ kHz if $N_{BlockedRBG}$ is even and $N_{Remainder-LTE}<N_{Remainder}<P$.

On the other hand, at block 832, the central frequency shift is set as a half of a PRB bandwidth multiplied by a difference between the first remainder and the RBG size, when the fourth amount is odd and the first remainder is less than or equal to the second remainder. That is, $FShift_{LTE}=-(P-N_{Remainder})*90$ kHz if $N_{BlockedRBG}$ is odd and $N_{Remainder} \leq N_{Remainder-LTE}$.

At block 834, the central frequency shift is set as an opposite number of a half of a PRB bandwidth multiplied by a sum of the first remainder and the RBG size, when the fourth amount is odd and the first remainder is greater than the second remainder. That is, $FShift_{LTE}=-(P+N_{Remainder})*90$ kHz if $N_{BlockedRBG}$ is odd and $N_{Remainder-LTE}<N_{Remainder}<P$. Here, the positive or negative sign represents the same meaning as the first option described above. That is, the positive central frequency shift represents shifting to the left side on a frequency axis, while the negative central frequency shift represents shifting to the right side on a frequency axis.

Figure 9A:
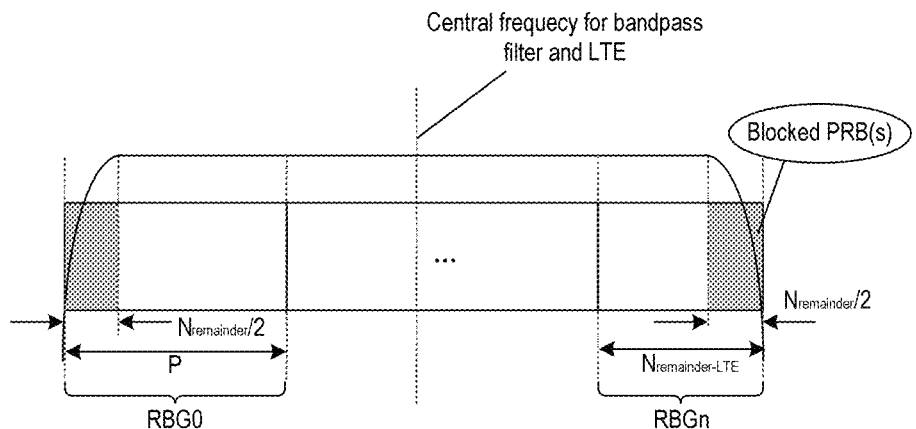
Figure 9B:
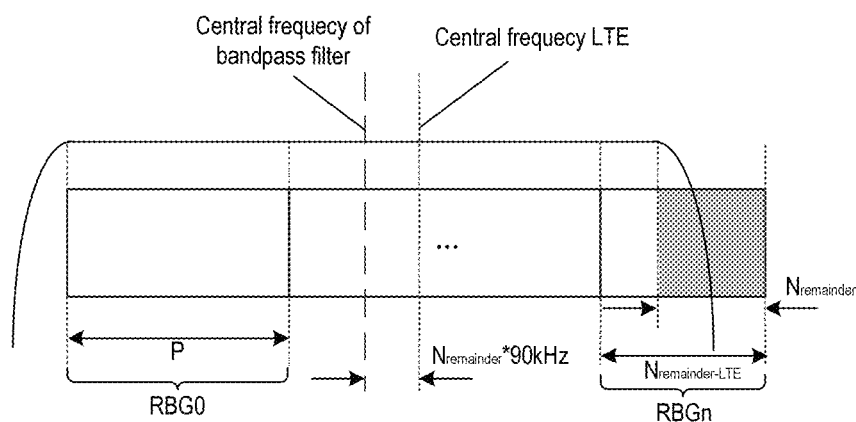

For example, in the scenario shown in FIGS. 9A-9B, it is supposed that $N_{BlockedPRB}=0$ and $N_{Remainder}<N_{Remainder-LTE}$. According to the existing solution shown in FIG. 9A, the central frequency of the bandpass filter is the same as the central frequency of LTE. Thus, the $N_{Remainder}$ PRB(s) will be symmetrical about the LTE central frequency. That is, on each of the left and right sides of the LTE central frequency, there will be $N_{Remainder}/2$ PRB(s) to be blocked. Because a part of RBG0 or RBGn is blocked, the other part of RBG0 or RBGn is also needed to be blocked. As a result, two RBGs (RBG0 and RBGn) will be blocked if the exiting solution is used.

In contrast, according to the solution of the present disclosure shown in FIG. 9B, Since $N_{BlockedRBG}$ is even and $N_{Remainder}<N_{Remainder-LTE}$, $FShift_{LTE}=N_{Remainder}*90$ kHz=$N_{Remainder}/2*W$prb. As shown in FIG. 9B, by shifting the central frequency of the bandpass filter by $N_{Remainder}*90$ kHz, only one RBG (RBGn) needs be blocked. In this way, more RBGs can be saved when compared with the existing solution. It should be noted that if the central frequency of the bandpass filter is shifted to the right side by $N_{Remainder}*90$ kHz, only RBG0 needs to be blocked. However, since RBG0 is larger than RBGn, more PRBs will be blocked if the central frequency is shifted to the right side instead of the left side.

Figure 9C:
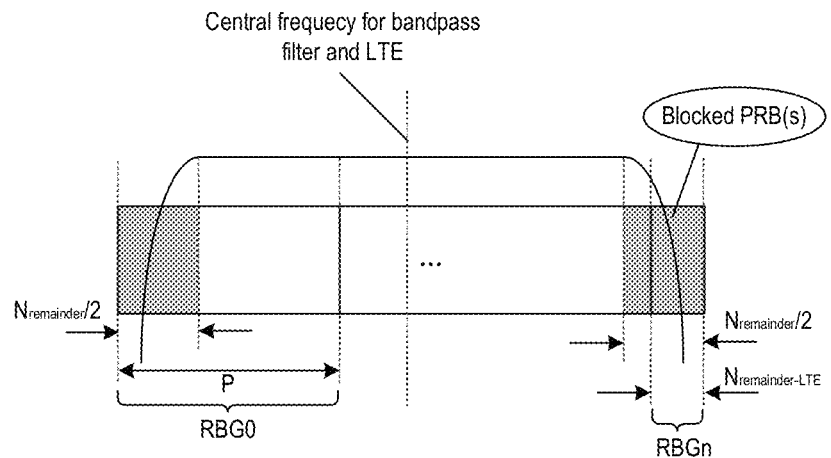
Figure 9D:
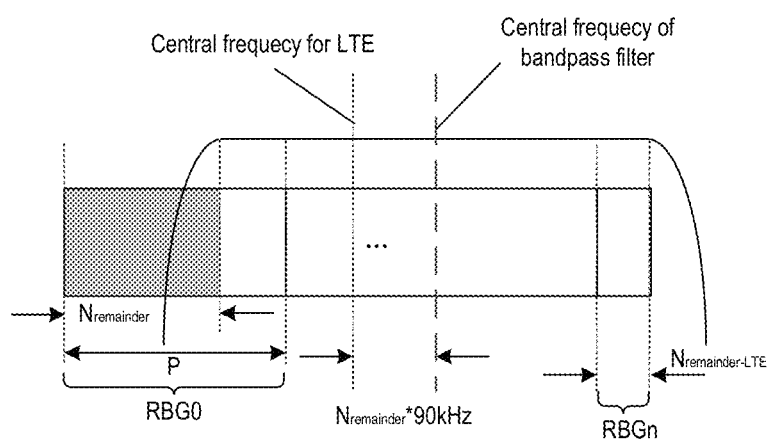

In the scenario shown in FIGS. 9C-9D, it is supposed that $N_{BlockedPRB}=0$ and $N_{Remainder}>2N_{Remainder-LTE}$. According to the existing solution shown in FIG. 9C, on each of the left and right sides of the LTE central frequency, there will be $N_{Remainder}/2$ PRB(s) to be blocked. Because a part of RBG0, RBGn-1 or RBGn is blocked, the other part of RBG0, RBGn-1 or RBGn is also needed to be blocked. As a result, three RBGs (RBG0, RBGn-1 and RBGn) will be blocked if the exiting solution is used.

In contrast, according to the solution of the present disclosure shown in FIG. 9D, Since $N_{BlockedRBG}$ is even and $N_{Remainder}>N_{Remainder-LTE}$, $FShift_{LTE}=-N_{Remainder}*90$ kHz=$-N_{Remainder}/2*W$prb. As shown in FIG. 9D, by shifting the central frequency of the bandpass filter by $-N_{Remainder}*90$ kHz, only one RBG (RBG0) needs to be blocked. In this way, more RBGs can be saved when compared with the existing solution. It should be noted that if the central frequency of the bandpass filter is shifted to the left side by $N_{Remainder}*90$ kHz, two RBGs (RBGn-1 and RBGn) need to be blocked. Thus, more PRBs will be blocked if the central frequency is shifted to the left side instead of the right side.

In the scenario shown in FIGS. 9E-9F, it is supposed that WB=4.5 MHz and Rpass=0.93. Then, some parameters can be determined as follows:

$$W\text{pass}=WB*R\text{pass}=4.5*0.93=4.185 \text{ MHz;}$$

$$N\text{prb}=\text{floor}(W\text{pass}/W\text{prb})=\text{floor}(4.185/0.18)=23;$$

Since 3 MHz<WB ≤ 5 MHz, $N_{RB-LTE}=25$ and P=2;

$$N_{BlockedPRB}=N_{RB-LTE}-N\text{prb}=25-23=2.$$

Thus, as shown in FIGS. 9E-9F, for the standard bandwidth of 5 MHz, there are 25 PRBs and 13 RBGs. In order to implement the nonstandard bandwidth of 4.5 MHz, 2 PRBs are needed to be blocked in theory. According to the existing solution shown in FIG. 9E, the central frequency of the narrow band filter is the same as the central frequency of LTE. Thus, 2 PRBs (PRB0 and PRB24) symmetrical about the LTE central frequency will be blocked. Because one half of RBG0 is blocked, the other half of RBG0 is also needed to be blocked. As a result, 3 PRBs will be blocked if the exiting solution is used.

In contrast, according to the solution of the present disclosure shown in FIG. 9F, the parameters for use in blocks 828-834 can be calculated as follows:

$$N_{BlockedRBG}=\text{floor}(N_{BlockedPRB}/P)=\text{floor}(2/2)=1;$$

$$N_{Remainder}=N_{BlockedPRB}-N_{BlockedRBG}*P=2-1*2=0;$$

$$N_{Remainder-LTE}=N_{RB-LTE}-\text{floor}(N_{RB-LTE}/P)*P=25-\text{floor}(25/2)*2=25-24=1.$$

Since $N_{BlockedRBG}$ is odd and $N_{Remainder}<N_{Remainder-LTE}$, $FShift_{LTE}=-(P-N_{Remainder})*90$ kHz=$-(2-0)*90$ kHz=$-180$ kHz. As shown in FIG. 9F, by shifting the central frequency of the narrowband filter by 180 kHz, only 2 PRBs (PRB0 and PRB1) will be blocked. In this way, one PRB can be saved and the spectral efficiency can be increased by 4.3% when compared with the existing solution.

Figure 10:
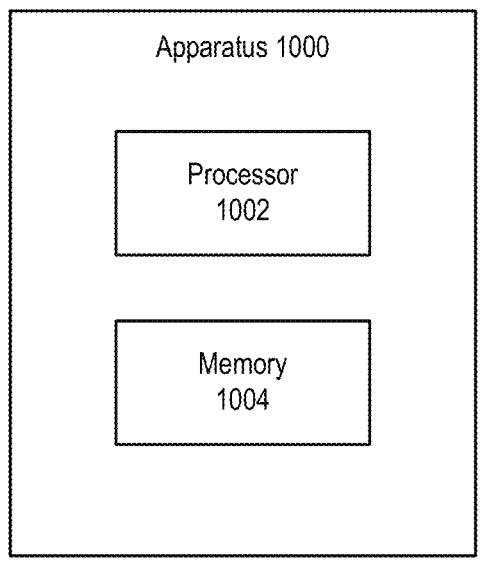
FIG. 10 is a block diagram showing an apparatus according to an embodiment of the disclosure.

FIG. 10 is a block diagram showing an apparatus according to an embodiment of the disclosure. As shown, the apparatus 1000 includes a processor 1002 and a memory 1004. The memory 1004 contains instructions which may be executed by the processor 1002 to cause the apparatus 1000 to perform the blocks described above with reference to FIGS. 2-4 and 6-8. The apparatus may be included in a radio unit (RU) or a digital unit (DU) of a network device (e.g., a base station), as described later.

As another embodiment, the apparatus may include a first determination module, a second determination module and a third determination module. The first determination module is configured to determine a first amount of PRBs available in a nonstandard bandwidth. The second determination module is configured to determine a second amount of PRBs available in a standard bandwidth corresponding to the nonstandard bandwidth. The third determination module is configured to determine a central frequency shift of the nonstandard bandwidth relative to the standard bandwidth, based at least on the first and second amounts. The first to third determination modules can be implemented as described above with reference to FIGS. 2-4 and 6-8.

Figure 11:
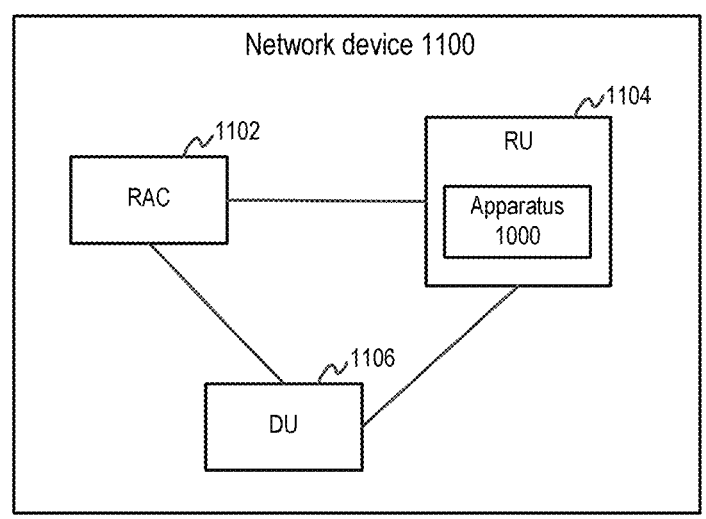
FIG. 11 is a block diagram showing a network device according to an embodiment of the disclosure.

FIG. 11 is a block diagram showing a network device according to an embodiment of the disclosure. The network device may be, for example, a base station. As shown, the network device 1100 includes a radio admission control (RAC) 1102, a RU 1104 and a DU 1106. The RAC 1102 is configured to obtain a bandwidth configuration from an operation administration and maintenance (OAM). The RAC 1102 may control admission or rejection of new radio bearer establishment requests. Its goal is to maximize radio resource utilization while ensuring that the required quality of service (QoS) is achieved for sessions which are already established.

The OAM is an entity that interfaces between base stations such as LTE eNodeBs. It may include an element management system (EMS) that consists of systems and applications for managing network elements. The EMS is generally proprietary, designed by each vendor to suit the needs of their equipments. A network operator can use the EMS to provide the bandwidth configuration to the RAC 1102.

The RU 1104 includes the apparatus 1000 as described above with reference to FIG. 10. Thus, it can determine the central frequency shift and the first amount of PRBs. The RU 1104 is further configured to obtain the bandwidth configuration from the RAC 1102 and feedback information about the determined central frequency shift and the first amount to the RAC 1102. Correspondingly, the RAC 1102 is further configured to, based on the information feedback, determine one or more PRBs that are blocked on the edge(s) of the standard bandwidth.

For example, the apparatus 1000 may determine the central frequency shifts corresponding to the first or second option of block 206. Correspondingly, the RAC 1102 may determine the blocked PRB(s) corresponding to the first or second option.

The DU 1106 is configured to obtain information about the one or more PRBs and the central frequency shift from the RAC and determine, based on the obtained information, which PRB(s) are to be blocked for resource scheduling. For example, when allocation type 0 as defined in 3GPP TS 36.213 is used for resource scheduling, if the blocked PRB(s) are determined according to the second option, the spectrum efficiency can be increased by applying less blocked PRBs and less control information bits.

In FIG. 11, the apparatus 1000 is included in the RU 1104 to determine the central frequency shift. However, it is also possible that the apparatus 1000 is included in the DU 1106. In this case, the RAC 1102 may inform both the RU 1104 and the DU 1106 of the bandwidth configuration. Then, the RU 1104 and the DU 1106 may determine the central frequency shift and the first amount of PRBs via the apparatus 1000, respectively. Then, either of the RU 1104 and the DU 1106 may inform the determined central frequency shift and the first amount to the RAC 1102. Then, the RAC 1102 may determine the blocked PRB(s) and inform the information thereof to the DU 1106 for performing resource scheduling.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method for implementing a nonstandard bandwidth at a network device, the method comprising:
   determining a first amount of physical resource blocks (PRBs) available in the nonstandard bandwidth;
   determining a second amount of PRBs available in a standard bandwidth corresponding to the nonstandard bandwidth; and
   determining a central frequency shift of the nonstandard bandwidth relative to the standard bandwidth, based at least on the first and second amounts, wherein determining the central frequency shift comprises:
      calculating a third amount of one or more PRBs that are blocked on the edge(s) of the standard bandwidth, the third amount is based on a difference between the second and first amounts; and
      setting the central frequency shift of the nonstandard bandwidth relative to the standard bandwidth based on the third amount.

2. The method according to claim 1, wherein determining the central frequency shift comprises:
   when the third amount is even, setting the central frequency shift as zero; and
   when the third amount is odd, setting the central frequency shift as a half of a PRB bandwidth, or an opposite sign number of a half of a PRB bandwidth.

3. The method according to claim 1, wherein the central frequency shift is determined based further on a resource block group (RBG) size corresponding to the nonstandard bandwidth.

4. The method according to claim 3, wherein determining the central frequency shift further comprises:
   calculating a fourth amount of one or more full RBGs available in the third amount of PRBs;
   calculating a first remainder, for a division of the third amount by the RBG size;
   calculating a second remainder, for a division of the second amount by the RBG size; and
   setting the central frequency shift based on the fourth amount, the first and second remainders.

5. The method according to claim 4, wherein setting the central frequency shift comprises:
   when the fourth amount is even and the first remainder is less than or equal to the second remainder, setting the central frequency shift as the first remainder multiplied by a half of a PRB bandwidth;
   when the fourth amount is even and the first remainder is greater than the second remainder, setting the central frequency shift as an opposite sign number of the first remainder multiplied by a half of a PRB bandwidth;
   when the fourth amount is odd and the first remainder is less than or equal to the second remainder, setting the central frequency shift as a half of a PRB bandwidth multiplied by a difference between the first remainder and the RBG size; and
   when the fourth amount is odd and the first remainder is greater than the second remainder, setting the central frequency shift as an opposite sign number of a half of a PRB bandwidth multiplied by a sum of the first remainder and the RBG size.

6. The method according to claim 1, wherein determining the first amount comprises:
   selecting a bandpass filter corresponding to the nonstandard bandwidth;
   calculating a passband bandwidth of the bandpass filter; and
   calculating the first amount based on the passband bandwidth.

7. An apparatus for implementing a nonstandard bandwidth at a network device, the apparatus comprising:
   a processor; and
   a memory, the memory containing instructions executable by the processor to operate the apparatus to:
   determine a first amount of physical resource blocks (PRBs) available in the nonstandard bandwidth;
   determine a second amount of PRBs available in a standard bandwidth corresponding to the nonstandard bandwidth; and
   determine a central frequency shift of the nonstandard bandwidth relative to the standard bandwidth, based at least on the first and second amounts, wherein determining the central frequency shift comprises:
      calculating a third amount of one or more PRBs that are blocked on the edge(s) of the standard bandwidth, the third amount is based on a difference between the second and first amounts; and
   setting the central frequency shift of the nonstandard bandwidth relative to the standard bandwidth based on the third amount.

8. The apparatus according to claim 7, wherein the instructions are executable by the processor to operate the apparatus to determine the central frequency shift by:
   when the third amount is even, setting the central frequency shift as zero; and
   when the third amount is odd, setting the central frequency shift as a half of a PRB bandwidth, or an opposite sign number of a half of a PRB bandwidth.

9. The apparatus according to claim 7, wherein the instructions are executable by the processor to operate the apparatus to determine the central frequency shift based further on a resource block group (RBG) size corresponding to the nonstandard bandwidth.

10. The apparatus according to claim 9, wherein the instructions are executable by the processor to operate the apparatus to determine the central frequency shift further by:
    calculating a fourth amount of one or more full RBGs available in the third amount of PRBs;
    calculating a first remainder, for a division of the third amount by the RBG size;
    calculating a second remainder, for a division of the second amount by the RBG size; and
    setting the central frequency shift based on the fourth amount, the first and second remainders.

11. The apparatus according to claim 10, wherein the instructions are executable by the processor to operate the apparatus to set the central frequency shift by:
    when the fourth amount is even and the first remainder is less than or equal to the second remainder, setting the central frequency shift as the first remainder multiplied by a half of a PRB bandwidth;
    when the fourth amount is even and the first remainder is greater than the second remainder, setting the central frequency shift as an opposite sign number of the first remainder multiplied by a half of a PRB bandwidth;
    when the fourth amount is odd and the first remainder is less than or equal to the second remainder, setting the central frequency shift as a half of a PRB bandwidth multiplied by a difference between the first remainder and the RBG size; and
    when the fourth amount is odd and the first remainder is greater than the second remainder, setting the central frequency shift as an opposite sign number of a half of a PRB bandwidth multiplied by a sum of the first remainder and the RBG size.

12. The apparatus according to claim 7, wherein the instructions are executable by the processor to operate the apparatus to determine the first amount by:
    selecting a bandpass filter corresponding to the nonstandard bandwidth;
    calculating a passband bandwidth of the bandpass filter; and
    calculating the first amount based on the passband bandwidth.

13. The apparatus according to claim 7, wherein the apparatus is included in a radio unit (RU) of the network device.

14. The apparatus according to claim 7, wherein the apparatus is included in a digital unit (DU) of the network device.

15. A network device comprising:
    a radio admission control (RAC) configured to obtain a bandwidth configuration from an operation administration and maintenance (OAM);
    a radio unit (RU) comprising the apparatus according to claim 7, wherein the RU is further configured to obtain the bandwidth configuration from the RAC and feedback information about the determined central frequency shift and the first amount of PRBs to the RAC, and wherein the RAC is further configured to, based on the information feedback, determine one or more PRBs that are blocked on the edge(s) of the standard bandwidth; and
    a digital unit (DU) configured to obtain information about the one or more PRBs and the central frequency shift from the RAC and determine, based on the obtained information, which PRB(s) are to be blocked for resource scheduling.

* * * * *